United States Patent [19]
Simmons et al.

[11] Patent Number: 5,895,195
[45] Date of Patent: Apr. 20, 1999

[54] RACK LOADER/UNLOADER SYSTEM AND METHOD OF USING SAME

[76] Inventors: Dave E. Simmons, 15174 Vista Del Rio, Chino, Calif. 91709; David E. Mateus, 1365 Winterwood La., Diamond Bar, Calif. 91765

[21] Appl. No.: 08/989,445

[22] Filed: Dec. 12, 1997

[51] Int. Cl.⁶ .................................................. B65G 1/06
[52] U.S. Cl. .................... 414/331; 414/417; 414/609; 414/811
[58] Field of Search .......................... 414/331, 417, 414/609, 800, 811; 198/347.2, 347.3

[56] References Cited

U.S. PATENT DOCUMENTS

| | | | |
|---|---|---|---|
| 2,661,100 | 12/1953 | Ashford | 414/331 |
| 2,718,972 | 9/1955 | Temple | 414/331 X |
| 4,621,969 | 11/1986 | Berghall et al. | 414/331 |
| 4,732,256 | 3/1988 | Dorner | 198/347.3 |
| 5,106,259 | 4/1992 | Anderson et al. | 414/331 X |
| 5,244,330 | 9/1993 | Tonjes | 414/331 |
| 5,310,300 | 5/1994 | Crabb et al. | 414/331 X |
| 5,400,894 | 3/1995 | Smith | 198/347.2 |
| 5,547,329 | 8/1996 | Hirai et al. | 414/331 X |
| 5,588,791 | 12/1996 | Akagawa | 414/331 |

FOREIGN PATENT DOCUMENTS 2802339 7/1979 Germany ................ 198/347.3

Primary Examiner—David A. Bucci
Attorney, Agent, or Firm—Higgs, Fletcher & Mack LLP; Bernard L. Kleinke, Esq.

[57] ABSTRACT

The rack loader/unloader system includes a rack unloader and a container elevator disposed on opposite sides of a rack conveyor to unload containers from a rack at a transfer station. The container elevator enables unloaded containers to be transported away from the transfer station as replacement containers are accumulated to replace the unloaded containers. A rack loader displaces the replacement containers from the container elevator into the rack.

22 Claims, 4 Drawing Sheets

RACK LOADER/UNLOADER SYSTEM AND METHOD OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Technical Field

The invention relates in general to a system for loading and unloading a container rack. The invention relates more particularly to a system and method for loading and unloading water bottles into and out of a water bottle rack.

2. Background Art

There have been many devices for loading/unloading trays and containers to and from transport racks. For example, loading and unloading devices were disclosed in U.S. Pat. Nos. 4,203,696; 4,277,216; 4,621,969; 4,929,140; 5,310,300; and 5,547,329.

The loading of full water bottles requires heavy duty loading equipment to accommodate the weight of each bottle. For a five gallon water bottle full of water, the approximate weight of the container and water is about forty-five pounds.

U.S. Pat. Nos. 4,203,696 and 4,277,216 disclose systems for loading and unloading trays to and from a tray rack. The disclosed systems include a conveyor coupled at one end to a vertical frame, and which extend away from the frame to engage the trays within the tray rack. Such systems are not suitable, however, for use with water bottles as the conveyors would be required to support full water bottles at an unsupported end thereof. Consequently, the conveyors would be subjected to undue stress, likely resulting in costly replacement or repair expenses.

U.S. Pat. Nos. 4,929,140 and 5,310,300 disclose systems for loading water bottles onto a bottle rack. The systems included devices for repositioning the water bottles, and devices for loading the repositioned water bottles onto the rack. Although the systems were suitable for loading full water bottles, the disclosed systems did not facilitate the unloading of empty water bottles from the rack.

Therefore, it would be highly desirable to have a system and method for loading and unloading water bottles to and from a rack.

U.S. Pat. Nos. 4,621,969 and 5,547,329 disclose systems for loading and unloading containers to and from a rack. The systems included a rack unloading device positioned at a rack unloading station, a rack loading device positioned at a rack loading station, and a conveyor system for transporting the rack between the rack unloading station and the rack loading station.

While the disclosed systems enabled a rack to be unloaded and loaded, the systems required two separate stations, each occupying its own allotted floor space. As a result, the disclosed systems did not utilize the available floor space efficiently.

Therefore, it would be highly desirable to have a new and improved system and method for unloading and loading a bottle rack. Such a system should be suitable for use to load and unload heavy bottles of water relative to the rack, and should use space efficiently.

SUMMARY OF THE INVENTION

Therefore, the principal object of the present invention is to provide a new and improved rack loader/unloader system for unloading and loading water bottles quickly and efficiently according to a novel method, wherein the system utilizes space in an efficient manner.

Briefly, the above and further objects of the present invention are realized by providing a new and novel rack loader/unloader system which can be operated in accordance with a novel method to unload and load a rack.

The rack loader/unloader system includes a rack unloader and a container elevator disposed on opposite sides of a rack conveyor to unload containers from a rack at a transfer station. The container elevator enables unloaded containers to be transported away from the transfer station as replacement containers are accumulated to replace the unloaded containers. A rack loader displaces the replacement containers from the container elevator into the rack.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
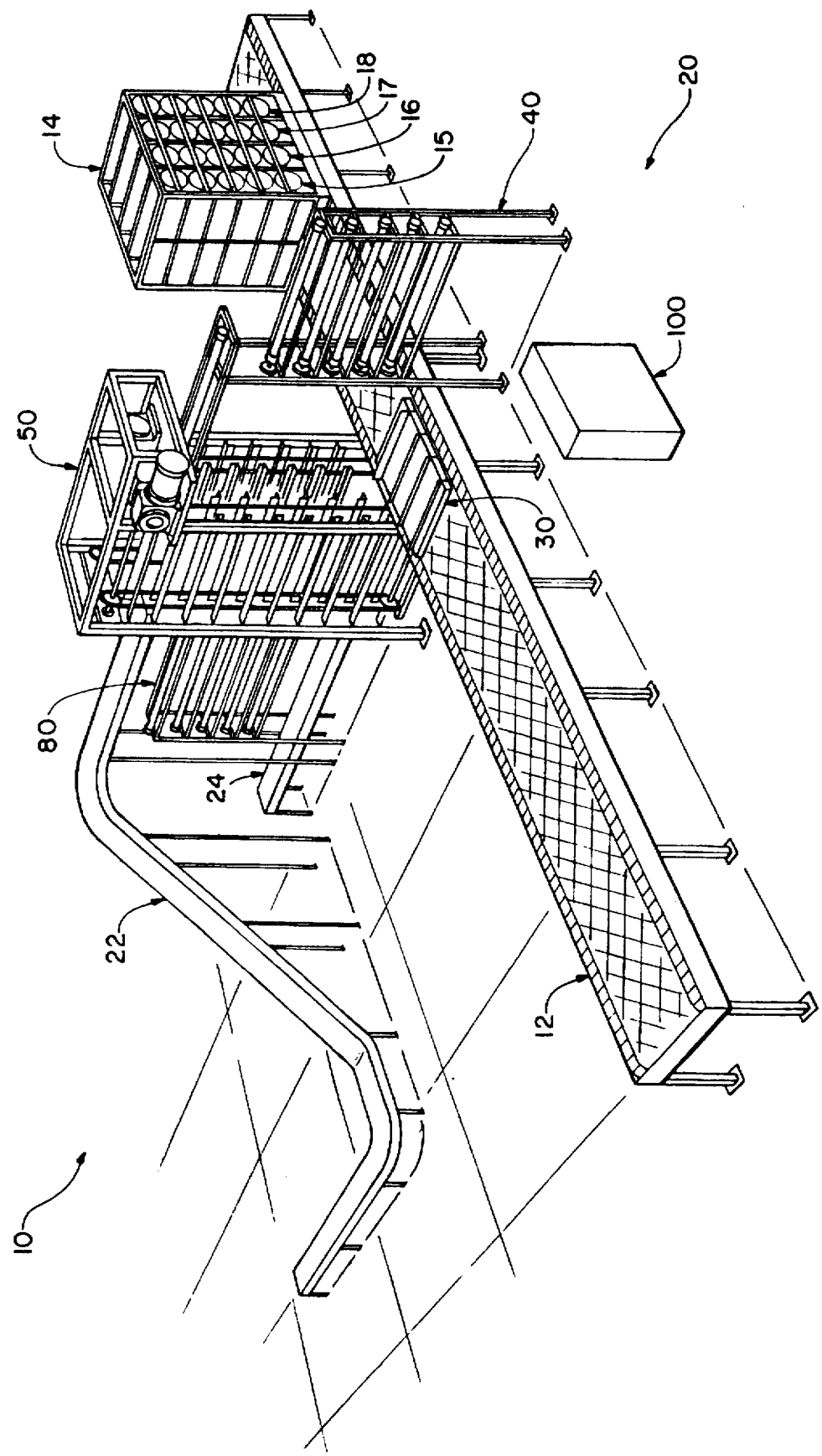
FIG. 1 is a perspective view of a rack loader/unloader system, which is constructed in accordance with the present invention.

Referring now to the drawings, and more particularly to FIG. 1 thereof, there is shown a rack loader/unloader system 10 which is constructed in accordance with the present invention. The system 10 facilitates the loading and unloading of container racks, such as the rack 14, in a quick and efficient manner, and utilizes a minimum amount of floor space.

The rack 14 is a conventional water bottle rack utilized by water delivery vehicles (not shown) to transport water bottles. The rack 14 is adapted to receive and support about twenty-four to thirty-six five-gallon water bottles. As shown in FIG. 1, the rack 14 is capable of storing four columns 15–18 of water bottles, each of the columns 15–18 having five vertical rows of bottles, with each row having two horizontally aligned water bottles. It will be understood by one skilled in the art that the rack 14 can have other combinations of columns and rows, and still be functional with the system 10. Although the use of five-gallon water bottles is described in the present application, it will be apparent to one skilled in the art that other containers can be loaded and unloaded from a rack in accordance with the present invention.

As shown in FIG. 1, the system 10 includes a rack conveyor arrangement 12 for transporting the rack 14 relative to a transfer station 20 for loading and unloading the rack 14. The conveyor arrangement 12 extends to an unloading area (not shown) to receive and transport the rack 14 having empty water bottles therein from an incoming water delivery vehicle (not shown). The conveyor arrangement 12 further extends to a loading area (not shown) to transport the rack 14 having full water bottles therein onto an outgoing water delivery vehicle (not shown). The conveyor arrangement 12 includes a rack positioning arrangement 30 at the transfer station 20 to facilitate the incremental loading and unloading of the rack 14.

To facilitate the unloading and loading of the water bottle columns 15–18, the system 10 further includes a rack unloader arrangement 40 disposed on one side of the conveyor arrangement 12, a container elevator 50 disposed across the conveyor arrangement 12 from the rack unloader 40, and a rack loader 80 adjacent to the container elevator 50, wherein the rack unloader 40, the container elevator 50 and the rack loader 80 are located at the transfer station 20, perpendicular to the conveyor arrangement 12 and substantially in alignment with one another.

An outfeed conveyor arrangement 22 extends from an upper end of the container elevator 50 to a bottle washing facility (not shown) to carry away unloaded bottles from the rack 14 for re-use. A replacement conveyor arrangement 24 extends from a water bottle filling facility (not shown) to a lower end of the elevator 50 for supplying full bottles to the transfer station 20.

The system 10 further includes a control arrangement 100 connected by conductors (not shown) to the rack conveyor arrangement 12, the rack positioning arrangement 30, the rack unloader arrangement 40, the container elevator 50, the rack loader arrangement 80, the outfeed conveyor arrangement 22, and the replacement conveyor arrangement 24 to control the operation and sequence of the system 10. The controller 100 can include a programmable controller or any other suitable automated control system.

Figure 2:
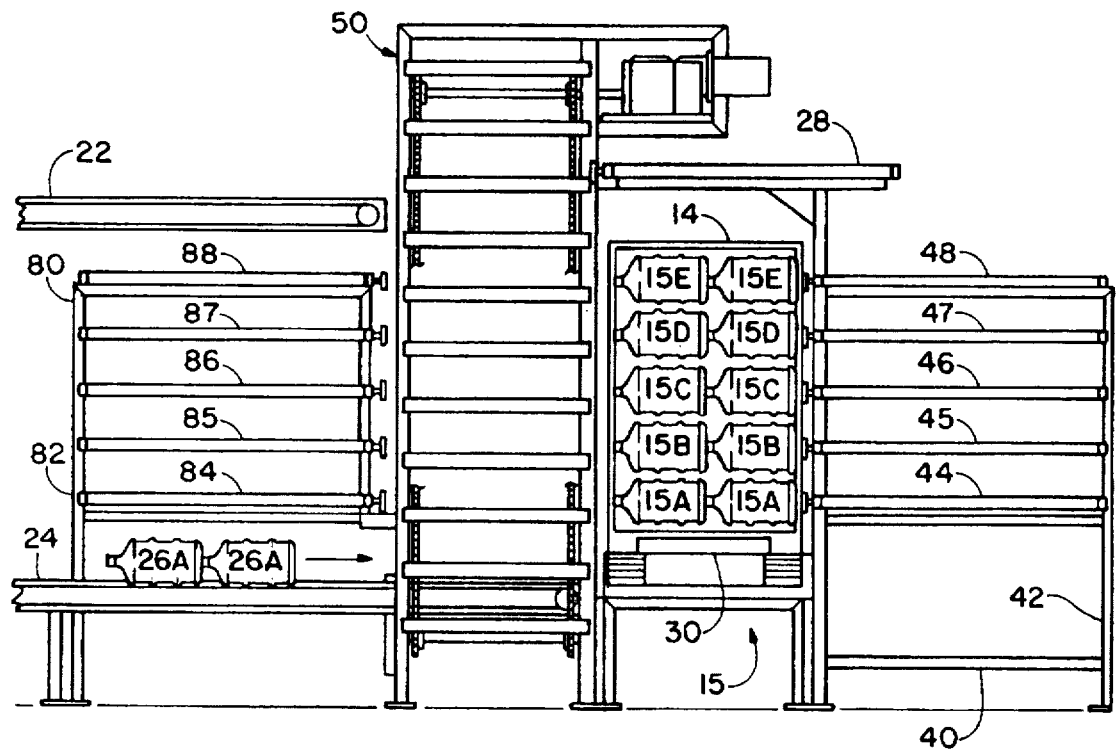
FIG. 2 is a diagrammatic elevation view of the rack loader/unloader system of FIG. 1 illustrating a rack at a transfer station in position for unloading.
Figure 3:
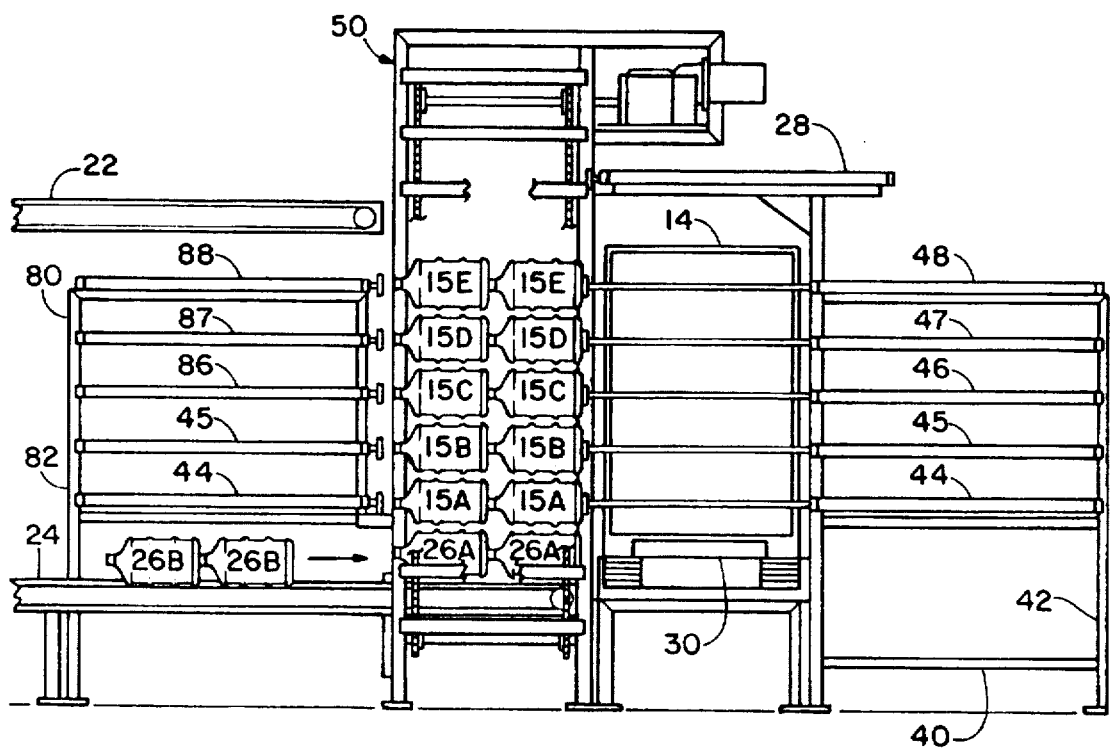
FIG. 3 is a diagrammatic elevation view of containers in the rack of FIG. 2 being unloaded into a container elevator as replacement containers are supplied to the container elevator.

In operation, the rack 14 containing columns 15–18 of empty bottles is transported to the transfer station 20 by the conveyor arrangement 12. The positioning arrangement 30 is activated to position the first column 15 of bottles in alignment with the rack unloader 40 and the container elevator 50 (FIG. 2). Once the column 15 is aligned, the rack unloader arrangement 40 is activated to displace horizontally the group or column 15 of bottles out of the rack 14. The displaced column 15 is received and supported in the container elevator 50 (FIG. 3).

The elevator 50 is activated to vertically displace the column 15 of bottles toward the upper end of the container elevator 50. The replacement conveyor arrangement 24 is activated to supply full replacement water bottles to the lower end of the container elevator 50. By incrementally advancing the container elevator 50, the replacement water bottles are continuously received within the container elevator 50 to form a replacement column of replacement water bottles.

Figure 4:
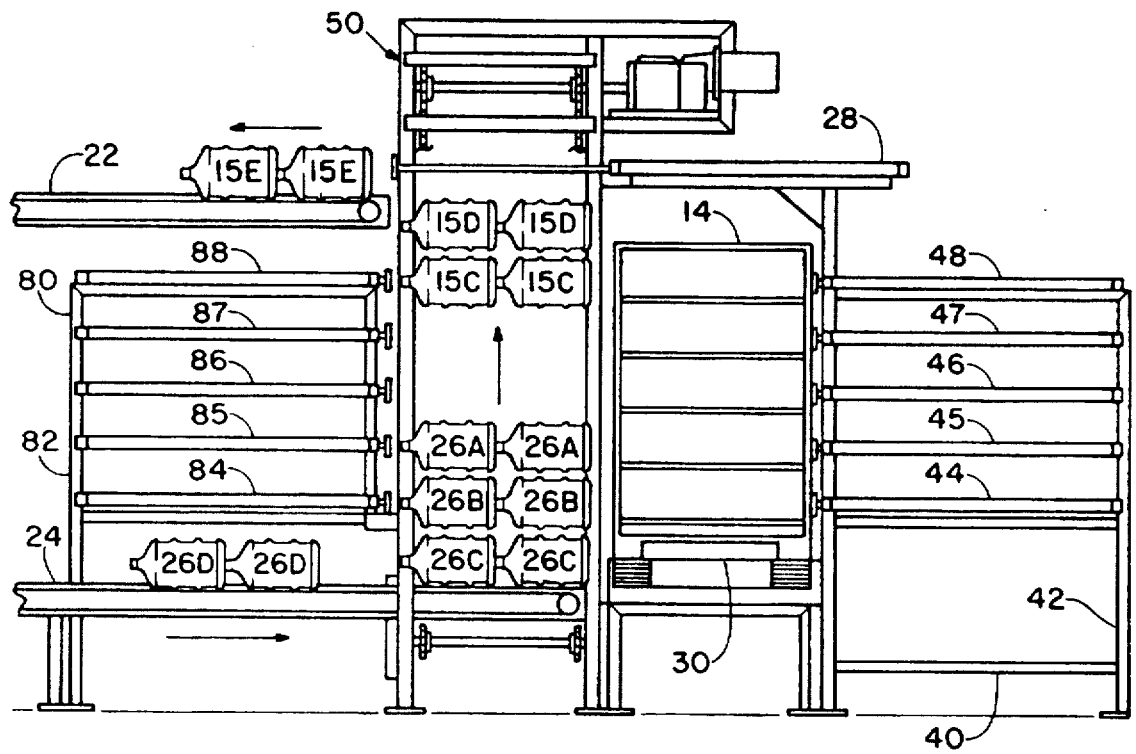
FIG. 4 is a partially cut-away diagrammatic elevation view of the unloaded containers being transported away from the container elevator as the replacement containers are accumulated.

The incremental vertical displacement of the container elevator 50 enables the replacement full water bottles to be accumulated in the container elevator 50, and also positions the displaced empty water bottles at the upper end of the container elevator 50. The outfeed conveyor arrangement 22 displaces horizontally the top most row of empty bottles from the container elevator 50, and transports the displaced empty bottles to the bottle washing facility (FIG. 4).

Figure 5:
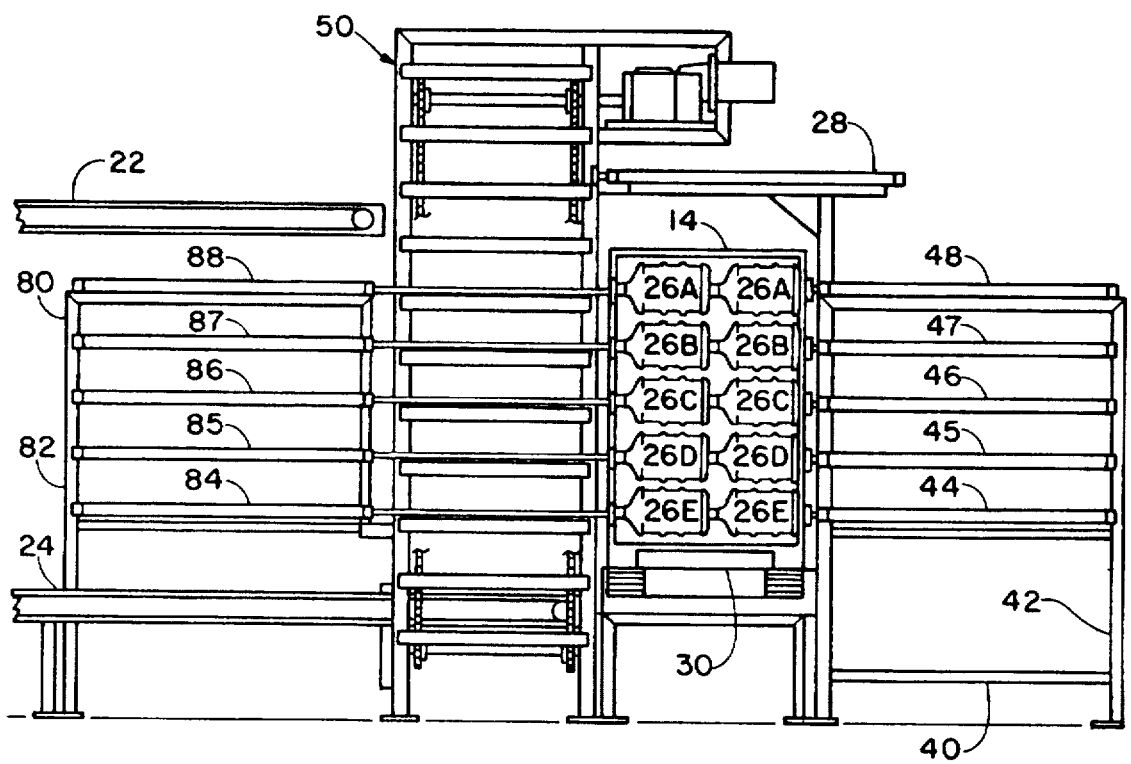
FIG. 5 is a diagrammatic elevation view of the accumulated replacement containers being loaded into the rack of FIG. 2.

The steps of activating the elevator 50 to incrementally vertically displace the empty bottles, supply replacement full bottles to the elevator 50, and displace the topmost empty bottle out of the elevator 50, are repeated until all of the empty bottles of the column 15 have been incrementally displaced to the upper end of the elevator 50 and displaced therefrom by the conveyor arrangement 22, and a replacement group or column of full water bottles corresponding to the column 15 of empty water bottles has been accumulated in the container elevator 50 and positioned in alignment with the rack loader 80. The rack loader 80 is then activated to push or horizontally displace the accumulated column of full water bottles out of the elevator 50 and into the rack 14, wherein the accumulated column of full water bottles occupies the same space previously occupied by the column 15 of empty water bottles (FIG. 5).

Once the column 15 has been replaced by the full water bottles, the positioning arrangement 30 and the conveyor arrangement 12 are activated to incrementally advance the rack 14. The rack positioning arrangement 30 subsequently positions the rack 14 to place the column 16 of empty water bottles in alignment with the rack unloader arrangement 40 and the container elevator 50. The column 16 of empty water bottles is replaced by a column of full replacement water bottles in the same manner as described in connection with the column 15 of empty water bottles. The rack 14 is subsequently positioned to unload and load the columns 17 and 18 with corresponding columns of full water bottles in the same manner as described above for the columns 15 and 16.

The operation of the system 10 can be controlled by the control arrangement 100 to unload and load various sizes and configurations of racks, such as the rack 14. Furthermore, the operation of the system 10 can also be controlled by the control arrangement 100 to operate according to an "unload only" sequence and according to a "load only" sequence. In this regard, full bottles may not be available for loading onto a rack, or a rack may not contain any empty bottles. In these situations, a complete unload/load sequence is not required. In the unload only sequence, the system 10 unloads the bottles as described previously, however, the loading of replacement bottles is not performed. In the load only sequence, the unloading sequence described previously is not performed, but the replacement bottles are loaded in the manner described above.

Figure 6:
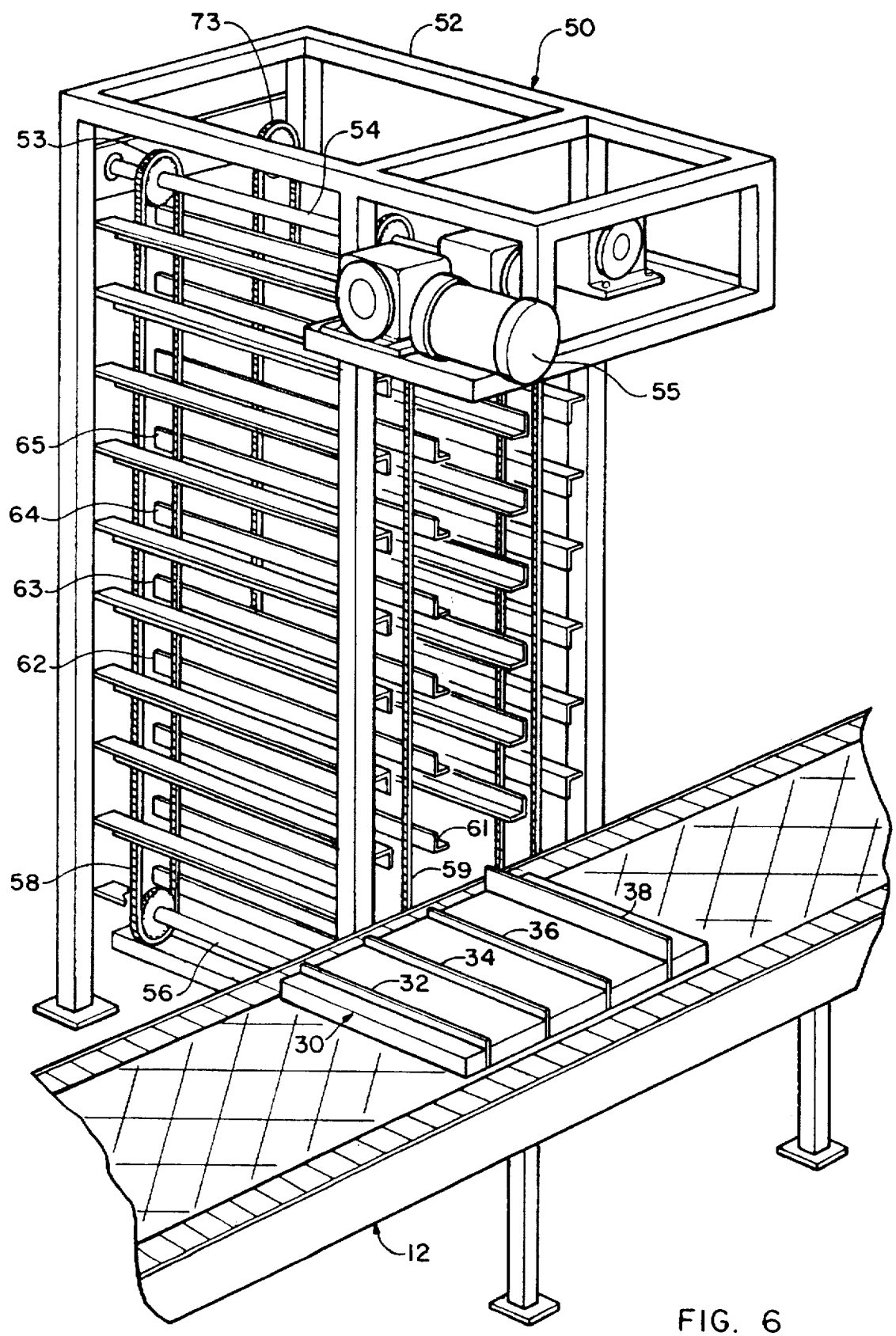
FIG. 6 is an enlarged partially cut-away perspective view of the container elevator and rack conveyor of the rack loader/unloader system of FIG. 1.

Considering now the positioning arrangement 30 in greater detail with reference to FIG. 6, the arrangement 30 includes a plurality of spaced apart stop members 32, 34, 36 and 38 for engaging and positioning the rack 14 relative to the container elevator 50. The stop members 32, 34, 36 and 38 are pneumatically or hydraulically controlled between a retracted position and an extended position. As shown in FIG. 6, stop member 38 is in an extended position to position the first column 15 (FIG. 1) of bottles in alignment with the elevator 50. The remaining stop members 32, 34 and 36 are shown in a retracted position which would permit the rack to pass over the stop members 32, 34 and 36.

In the preferred method of operation, all of the stop members 32, 34, 36 and 38 are initially extended to the extended position. Upon completion of the unloading and loading of the first column 15 of the rack 14, the stop member 38 is retracted and the conveyor arrangement 12 moves the rack 14 to the next extended stop member 36. The rack 14 is subsequently moved to each remaining stop member 34 and 32 as the corresponding columns 17 and 18 unloaded and loaded until the rack 14 has been completely unloaded and loaded, wherein the last stop member 32 is retracted and the conveyor arrangement 12 transports the rack 14 to the loading area.

As best seen in FIG. 2, the rack unloader 40 includes a frame 42 for supporting a plurality of vertically-aligned rack pushers/pistons 44, 45, 46, 47 and 48. The pushers/pistons 44–48 are spaced apart from one another and are adapted to engage the individual rows of a bottle column, such as column 15. The column 15 of bottles includes five vertical rows of pairs of empty bottles 15A–15E. Each pusher/piston 45–48 is associated with a corresponding row of column 15, and is controlled to urge its associated row of empty bottles 15A–15E out of the rack 14 and into the container elevator 50 (FIG. 3).

Considering now the container elevator 50 in greater detail with respect to FIG. 6, the elevator 50 includes a frame 52, a left drive arrangement 53 and a right drive arrangement 73. As the left drive arrangement 53 and the right drive arrangement 73 are substantially similar, only the left drive arrangement 53 will be described in further detail. The left drive arrangement 53 includes a drive shaft 54 at the upper end of the elevator 50 and a driven shaft 56 at the lower end of the elevator 50. A pair of continuous conveyor chains 58 and 59 are coupled rotatably between the drive shaft 54 and the driven shaft 56. A motor 55 coupled to the drive shaft 54 drives the chains 58 and 59 under the control of the control arrangement 100. A plurality of L-shaped support members, such as support members 61, 62, 63, 64 and 65, are connected horizontally between the chains 58 and 59 to help support bottles in the elevator 50. The support members 61–65 are spaced apart along the chains 58 and 59 by a distance corresponding to the relative position of the bottles in the columns 15–18 in the rack 14. The support members 61–65 cooperate with like members of the right drive arrangement 73 to define container pockets in a vertical column to receive and support vertical columns of bottles, such as the columns 15–18.

The uppermost container pocket defines in outfeed position to facilitate transporting empty bottles, such as bottles 15A–15E, away from the elevator 50. The lowermost container pocket defines an infeed position to facilitate supplying full water bottles to the elevator 50. The motor 50 is operable to raise incrementally the pockets, one pocket at a time, to continuously raise a new pocket to the outfeed position, and to continuously form a new pocket at the infeed position. The replacement conveyor arrangement 24 extends to the lower end of the elevator 50 to continuously deliver full replacement water bottles, such as bottles 26A–26E, to the infeed position (FIGS. 2–3). Each time the motor 50 raises the pockets, a new pair of replacement bottles is delivered to the infeed position. Eventually, a column of replacement bottles 26A–26E are accumulated in the pockets of the elevator 50.

Concurrently with the accumulation of the replacement bottles 26A–26E, the empty bottles 15A–15E are incrementally positioned at the outfeed position where the empty bottles 15A–15E are displaced from the elevator 50 one row at a time (FIG. 4).

The outfeed conveyor arrangement 22 (FIG. 4) includes a bottle pusher/piston 28 aligned with the conveyor 22 at the outfeed position for displacing a topmost row of bottles 15A–15E from the elevator 50 onto the conveyor 22.

The rack loader arrangement 80 is substantially similar to the rack unloader arrangement 40, and includes a frame 82 to support a plurality of vertically aligned bottle pushers/pistons 84, 85, 86, 87 and 88. The pushers/pistons 84, 85, 86, 87 and 88 are spaced apart and adapted to engage individually each row of full bottles 26A–26E accumulated in the elevator 50. The bottle pusher/pistons 84–88 are operable to displace horizontally each row of pairs of bottles in the column of full bottles 26A–26E out of the elevator 50 and into the rack 14 to occupy the positions previously occupied by the corresponding column 15 of empty bottles 15A–15E (FIG. 5).

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A rack loader/unloader system for handling containers in a rack, comprising:

a rack conveyor for positioning the rack relative to a transfer station;

a rack unloader disposed at the transfer station adjacent to said rack conveyor for displacing horizontally a group of the containers out of the rack;

a container elevator having a pair of vertically spaced apart ends and disposed at the transfer station opposite said rack unloader for receiving and displacing vertically said displaced container group, and for accumulating a group of replacement containers corresponding to said displaced container group as said displaced container group is displaced vertically; and a rack loader adjacent to said container elevator for displacing horizontally said replacement container group out of said container elevator and into the rack.

2. A system according to claim 1, wherein the containers of said displaced container group are arranged in a vertical column having a plurality of rows of containers, and the replacement containers of said replacement container group are arranged in another vertical column having a plurality of rows of replacement containers.

3. A system according to claim 2, wherein said rack conveyor includes a rack positioning arrangement for incrementally positioning the rack at the transfer station to facilitate displacing another container group from the rack.

4. A system according to claim 2, wherein each row of containers includes two horizontally aligned containers.

5. A system according to claim 1, further including a replacement conveyor for supplying said replacement containers to said container elevator at one of said ends.

6. A system according to claim 5, wherein said container elevator incrementally displaces said displaced container group row by row to enable said replacement conveyor to supply a new row of replacement containers each time said displaced container group is displaced by a row.

7. A system according to claim 2, wherein said rack unloader includes a plurality of vertically aligned container pushers, each one of said container pushers associated with a corresponding row of said vertical column.

8. A system according to claim 2, wherein said rack loader includes a plurality of vertically aligned container pushers, each one of said container pushers associated with a corresponding row of said another vertical column.

9. A system according to claim 1, further including an outfeed conveyor arrangement disposed at said other one of said ends for transporting the containers of said displaced container group away from said container elevator as said container elevator displaces said displaced container group.

10. A system according to claim 9, wherein said outfeed conveyor arrangement includes an outfeed pusher for pushing the containers out of said container elevator at said another end, and a conveyor means to transport said pushed containers away from said container elevator.

11. A system according to claim 9, wherein said container elevator includes two pairs of conveyor chains drivably connected between said end and said another end, a plurality of support members coupled between one of said pairs of chains and another plurality of support members coupled between another one of said pairs of chains, said plurality and another plurality of support members cooperating with one another to define a continuous vertical column of container receiving pockets for supporting said displaced container group and said replacement container group, wherein said column of pockets includes a sufficient number of pockets to support a row of said replacement containers and said displaced container group.

12. A system according to claim 1, further including means coupled to said rack conveyor, said rack unloader, said container elevator, said replacement conveyor and said rack loader for controlling the operation and sequence of operation of said rack conveyor, said rack unloader, said container elevator, said replacement conveyor and said rack loader to load and unload the rack.

13. A method for replacing containers in a rack, comprising:

using an unloader, an elevator having spaced apart ends, and a loader aligned with the elevator, said unloader and said elevator being in alignment with one another and disposed at a transfer station on opposite sides of the rack;

positioning the rack at the transfer station;

displacing horizontally a group of the containers out of the rack with said unloader;

receiving and supporting said displaced container group in said elevator;

displacing vertically said displaced container group between said ends;

accumulating a group of replacement containers corresponding to said displaced container group as said elevator displaces said displaced container group; and displacing horizontally said replacement container group out of said elevator and into the rack with said loader to replace said displaced container group with said replacement container group in the rack.

14. A method according to claim 13, further including arranging the containers of said displaced container group in a vertical column having a plurality of rows of containers, and arranging the replacement containers of said replacement container group in another vertical column having a plurality of rows of replacement containers.

15. A method according to claim 14, further including incrementally horizontally positioning the rack to facilitate displacing another container group from the rack.

16. A method according to claim 14, further including incrementally displacing said displaced container group by rows to enable a new row of replacement containers to be supplied each time said displaced container group is displaced by a row.

17. A method according to claim 14, further including transporting the containers of said displaced container group away from said elevator as said elevator displaces said displaced container group.

18. A method according to claim 17, further including pushing the containers out of said elevator at said another end.

19. A method according to claim 13, further including controlling the operation, and sequence of operation, of said unloader, said elevator and said loader to initially displace said container group from the rack, displace vertically said displaced container group while accumulating said replacement containers in said replacement container group, and finally displacing said replacement container group into the rack to replace said displaced container group.

20. A method according to claim 13 further including controlling the operation, and sequence of operation, of said unloader, said elevator and said loader to displace said container group from the rack while restraining the supply of replacement containers.

21. A method according to claim 13, further including controlling the operation, and sequence of operation, of said unloader, said elevator and said loader to inhibit said step of displacing said group of containers out of the rack while enabling the displacement of said replacement container group into the rack.

22. In a rack loader/unloader system having an unloader and a loader in alignment with a rack, a replacement container infeed, and a container outfeed for unloading a vertical column of containers from the rack and for loading a vertical column of replacement containers onto the rack, an elevator assembly comprising:

an upright frame having an upper end a lower end;

a pair of continuous conveyor chains supported rotatably between said upper end and said lower end, and another pair of continuous conveyor chains supported rotatably between said upper end and said lower end and spaced apart from said pair of continuous conveyor chains;

a plurality of support members spaced apart vertically and coupled to said pair of continuous conveyor chains, and another plurality of support members spaced apart vertically and coupled to said another pair of continuous conveyor chains, said plurality of support members and said another plurality of support members cooperate with one another to define a plurality of container pockets in a vertical column for supporting the vertical container column and the vertical replacement container column therein;

wherein an uppermost container pocket defines an outfeed position to facilitate carrying away the containers of the vertical container column, and a lowermost container pocket defines an infeed position to facilitate supplying the replacement containers to the vertical replacement column supported by said container pockets; and motor means for driving said pair and said another pair of conveyor chains to incrementally raise said container pockets one pocket at a time to continuously raise a new one of said container pockets to said outfeed position and to continuously form a new container pocket at said infeed position.

* * * * *